May 1, 1928. 1,667,852
J. GLUCK
TAPE READING DEVICE
Filed Feb. 16, 1923 3 Sheets-Sheet 2
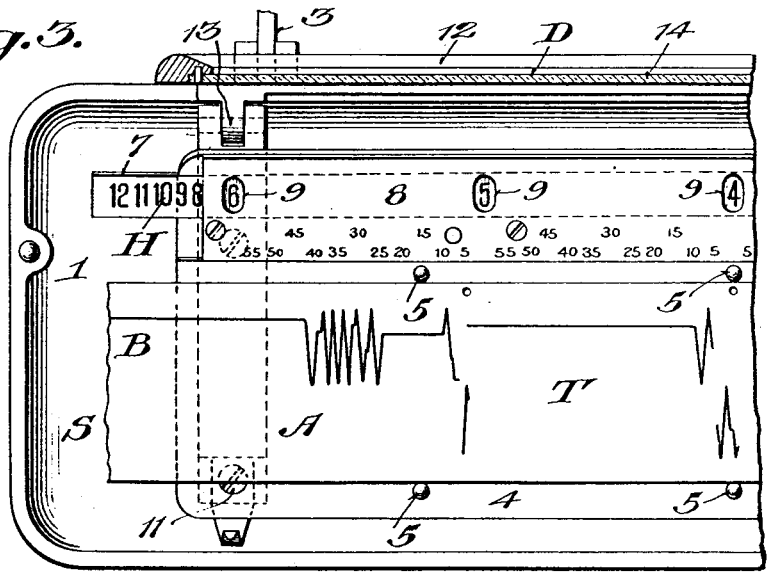
Fig. 3.
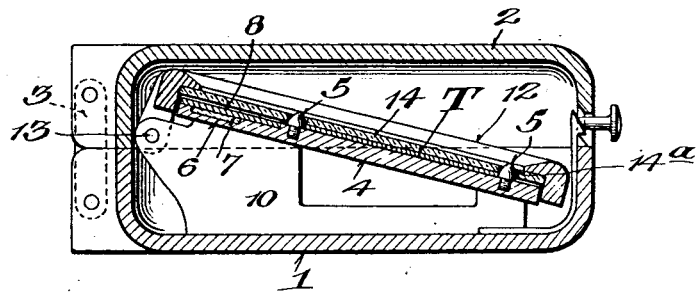
Fig. 4.
Fig. 5.
Witnesses:-
Chas. L. Griesbauer
Emory L. Groff
Inventor
Julius Gluck,
By D. P. Wolhaupter
Attorney May 1, 1928.  1,667,852
J. GLUCK
TAPE READING DEVICE
Filed Feb. 16, 1923  3 Sheets-Sheet 3
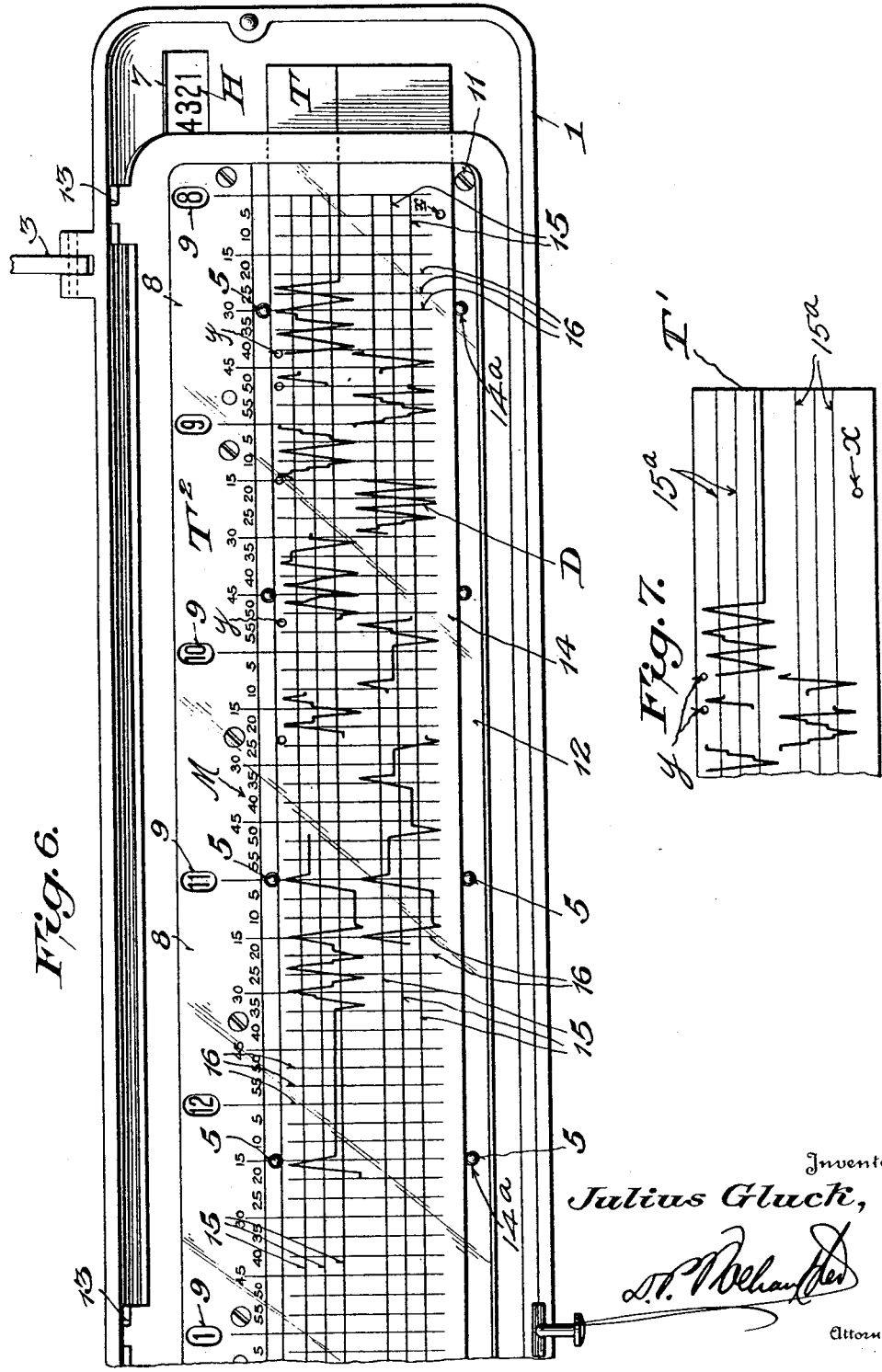
Inventor
Julius Gluck,
Attorney Patented May 1, 1928.

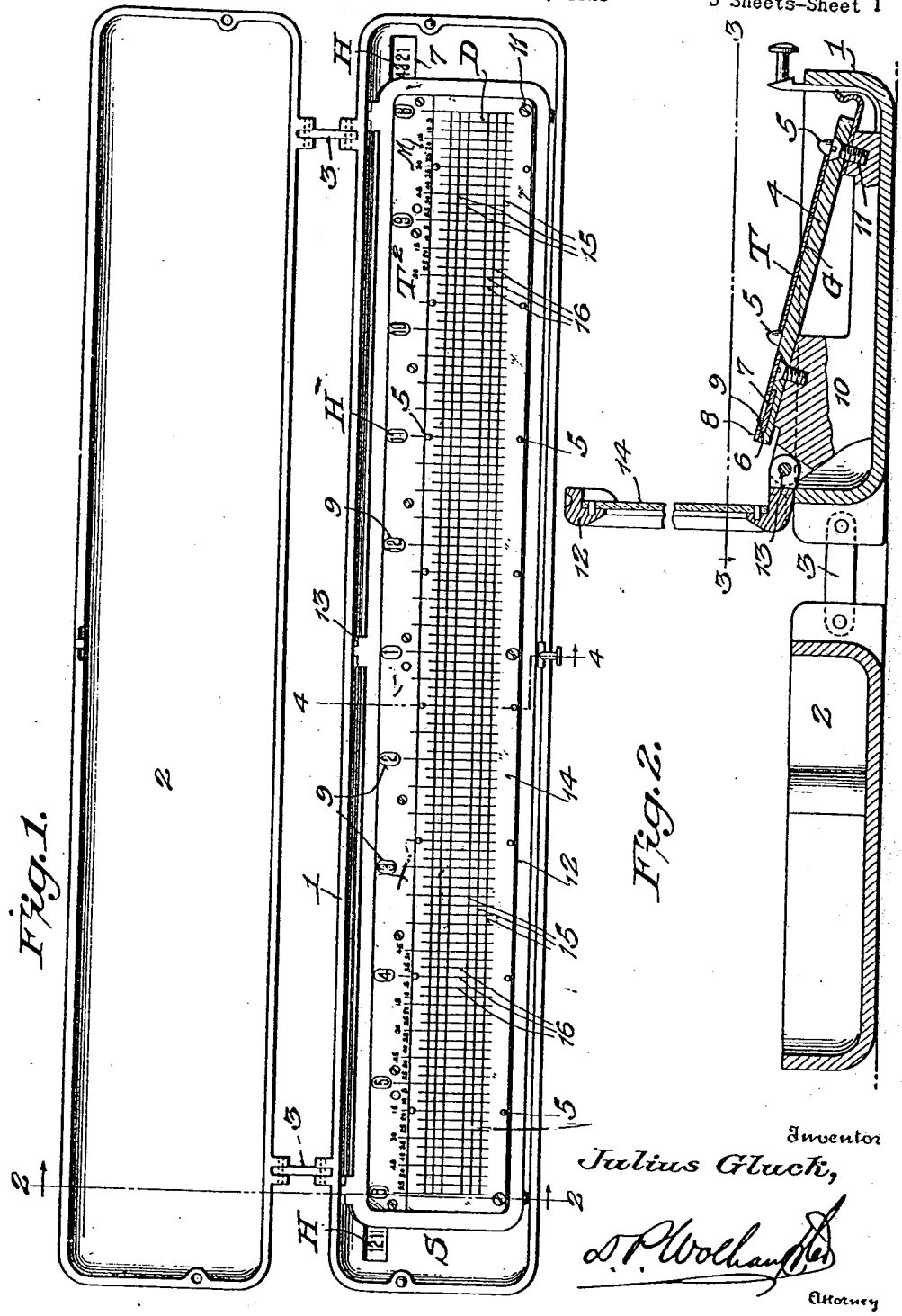

1,667,852

UNITED STATES PATENT OFFICE.

JULIUS GLUCK, OF NEW YORK, N. Y., ASSIGNOR, BY MESNE ASSIGNMENTS, TO OHMER FARE REGISTER COMPANY, OF DAYTON, OHIO, A CORPORATION OF NEW YORK.

TAPE-READING DEVICE.

Application filed February 15, 1923. Serial No. 619,536.

This invention relates to a novel scale for reading record tape produced by recording devices used in conjunction with taximeters.

To that end, the invention contemplates a device whereby the record on the tape may be read with facility by the operator of the vehicle to thereby give a detailed report of each movement of the vehicle or cab during its working day. For example the device is especially adapted to graphically visualize the record lines made on the tape by a recording device of the type shown in my Patent 1,473,816, filed April 18, 1922, wherein the recording mechanism makes record lines upon an unprinted tape.

As indicated in that case it is not always desirable to use a record tape having longitudinal and vertical crossing lines thereon for the reason that the vertical lines which are calibrated for units of time must accurately be set with reference to the point of the marking pencil at the time the cab starts out of the garage. This setting not only presents difficulties but is a nuisance and therefore it is desirable to use a plain unprinted tape, or a tape having only longitudinal distance indicating lines thereon, the time lines being entirely omitted.

Accordingly, a primary object of the invention is to provide a simple and practical scale device which is provided with time and distance scales so that the record on the partially printed or unprinted tape can be readily deciphered at a glance. All cab operators keep a record of the time that the car leaves the garage, and, when the vehicle turns in, the section of tape representing the working day may be removed from the recording device, and placed in the present scale to be read. The operator can readily set the hour indicator to agree with the nearest hour that the cab left the garage, and then all subsequent movements of the cab can be readily and graphically visualized at a glance by superimposing the transparent minute and distance scale on the tape.

A further object of the invention is to provide a practical and reliable construction which permits of readily inserting and accurately adjusting the tape in a thoroughly simple and practical manner so that no particular skill is required in the adjusting and reading of the tape.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a top plan view of the present reading device and its protecting casing, the cover of the latter being raised to expose the scale.

Figure 2 is a transverse sectional view taken on the line 2—2 of Figure 1.

Figure 3 is a sectional view taken on the line 3—3 of Figure 2.

Figure 4 is a transverse sectional view taken on the line 4—4 of Figure 1, the cover being closed.

Figure 5 is a detail view of the sliding strip bearing the hour indicator.

Figure 6 is an enlarged detail view of a portion of the apparatus illustrating the application thereof.

Figure 7 is a detail view of a partially printed tape.

Similar reference characters designate corresponding parts throughout the several figures of the drawings.

As previously indicated, the recording mechanism of my Patent 1,473,816 filed April 18, 1922, marks its record lines on a plain tape designated generally as T, the said record lines giving a complete record of time, distance and speed. In addition to providing records of these important factors in the operation of the cab, the said device also records the paid and unpaid waiting time, another very important factor in the operation of a cab, and which has heretofore been almost entirely out of control of the operator.

In order that the various record lines on the tape may be more readily understood reference will first be made briefly to the manner in which they are made and what they mean.

When the vehicle is running on an earning trip the record A is made on the lower half of the tape. However, when the vehicle is running vacant, as when cruising for a fare, the record B is made on the upper part of the tape.

Also if the flag of the meter on the vehicle is placed in not recording position, as when a tire change is required, or any other reason which makes it improper to charge the passenger fees for which he is not responsible, the record lines A and B will appear simultaneously on the tape.

In explanation of the general character of the lines comprising the records A and B it is pointed out that when the vehicle is standing still a horizontal record line is made and while the cab is in motion an oblique record line will be made. In the latter connection it is pointed out that the slope of the oblique line may be utilized to determine the speed of the vehicle, the greater the speed the steeper the line. A type of speed scale is shown in Figure 11 of my Patent 1,473,816 aforesaid.

The present scale device however, is particularly intended to read the time and distance records on the tape, which, latter, as previously indicated, is not printed or calibrated in lines or squares, or in other words is a plain strip or ribbon without lines.

Owing to the difficulty of properly adjusting a previously ruled or calibrated tape each time the vehicle starts out of the garage and other objections, it is more desirable to use a plain unmarked tape so that the tape never has to be adjusted or set when the vehicle leaves the garage, although as indicated a partially printed tape may be used. It is therefore very desirable to use a tape which, when removed from the recording device, may be adjusted with ease and facility in the present reading device to give the desired information.

Referring now more particularly to the structural features and characteristics of the invention it will be observed that the same preferably includes a housing or casing comprising a body 1 and a cover 2 hinged thereto as at 3 and protecting the scale designated generally as S when the cover is closed.

In its primary aspect the reading scale proper includes a guideway G through which the tape T may be passed or threaded; a time scale designated generally as T² at one side of the guideway, and including an adjustable hour indicator H, and the minute scale M; and the guideway G having superimposed thereon a transparent distance scale D suitably calibrated to project the minute readings onto and across lines representing fractions of a mile.

The above essential elements are of course susceptible to different forms of embodiment, but, according to a preferred and practical example shown in the drawings, the said scale S includes a body 4 having thereon the spaced lugs or pins 5 which form part of a guideway G for the tape, and also having therein a groove 6 for accommodating the sliding or adjustable strip 7 bearing an hour indicator H, the said strip being held in position by a mask or facing plate 8 which is provided with regularly spaced openings 9 to expose the figures on the hour indicator in proper sequence. Said body 4 of the scale is preferably held to a suitable base 10 secured within the housing 1 by the screws 11 or other fastenings, and the transparent distance scale D is hinged at the rear edge of the base 10.

The distance scale D preferably comprises a frame 12 which is hinged to the base 10 as at 13 and a transparent celluloid or equivalent plate-like part 14 which is provided with horizontal and vertical lines 15 and 16 respectively which form measuring squares. The longitudinal lines 15 are spaced to represent ⅛th of a mile so that the total distance across the scale will be one mile (one-half mile being the distance adapted to be travelled by each pencil of the recording device) while the vertical or crosswise lines 16 register with the numerals of the minute scale M to represent 5 minute periods in the time scale T². This is clearly indicated in Figure 1 where the said vertical or crosswise lines between each of the openings 9 are projected to read on numerals corresponding to each 5 minutes in the hour.

In connection with the transparent distance scale D and the spaced lugs or pins 5 it will be observed that the said transparent part 14 is provided with openings 14ᵃ through which the lugs 5 project to insure the proper closing or fitting of the transparent cover-like member 14 onto the base 4. Furthermore, by reason of the interlocking of the lugs with the transparent plate 14, the tape is properly positioned and held flat in the guideway G so that it may be readily moved or adjusted beneath the scale marks 15 and 16.

Referring to the manner in which the present reading device is used it may be pointed out that when the cab finishes its trip or run the tape T is removed from the recording device, and, as shown in Figure 3, the unprinted tape bearing the earned fare record A and the idle cruising record B may be placed in the guideway G, that is, between the lugs 5 while the cover-like transparent distance scale D remains elevated. This cover D is then lowered or closed so that the lugs 5 register with the holes 14ᵃ, thus holding the tape flat and smooth beneath the transparent scale D. The strip 7 bearing the hour indicator H may then be shifted in the channel 6 so that the nearest hour preceding the time when the cab left the garage will appear in the extreme right hand opening 9 of the face plate. For example, the numeral "8" as shown in Figure 6 of the drawings.

With the tape positioned as shown in Figure 6 the same may be read as follows:

As previously indicated all taxicab operators keep as part of their record the time each cab leaves the garage.

In the example given the car left the garage at 8.22. Therefore, the start of the oblique line, which indicates the first movement of the car, is set at 22 on the scale and the hour slide is set at 8 o'clock. With the tape set in this way in the scale the time of every movement of the cab can be determined.

This particular tape shows that the car left the garage with flag up at 8.22; traveled 3⅜ miles with only one stop of 2 minutes.

At 8.41 the first trip was made with flag in "recording" position which is indicated by a hole $y$ being punched in the upper part of the tape, the record being made from then on, on the lower part of the tape. The cab traveled with a passenger ⅞ mile and finished the trip at 8.47.

The cab then traveled ½ mile with flag up.

At 8.50 the second trip started and was completed at 9 o'clock, the car having traveled 1⅝ miles with several short stops—probably due to traffic congestion.

The flag was put up and the cab traveled 2⅛ miles until 9.15 when the third passenger was picked up. This trip finished at 9.28; distance traveled 3⅛ miles; no waiting time.

3½ miles was then covered with flag up and one stop of 3 minutes from 9.34 to 9.37.

Fourth trip started at 9.52 and completed at 10.10; total distance covered 1½ miles with 10 minutes waiting time—indicated by the horizontal line between 9.58 and 10.08.

From 10.10 to 10.23 the cab ran vacant and at 10.23 the next earning trip was made; the cab traveled with a passenger ⅜ mile and waited for 7 minutes; it then traveled ½ mile and waited for 10 minutes; another ½ mile and the flag was put in not-recording at 10.48. It waited for 10 minutes, traveled ⅝ mile, waited 10 minutes, traveled ⅞ mile and at 11.17 the flag was put in the vacant position.

The fact that the cab was operated with the flag in the not-recording position means that no money was registered on the meter for waiting time.

The cab then traveled 2⅜ miles with flag up and waited for 40 minutes from 11.34 to 12.14.

The record is continued until the day's work is completed.

From the foregoing it will be clear that the present device may be quickly and conveniently set to meet the conditions of the particular record, and all movements and stops of the cab throughout the period away from the garage may be readily checked up at a glance. With a record of the character provided on the tape T and the present reading device it is impossible for the taxicab driver to waste time, and a complete control of the operation of the car is obtained whether the cab is cruising with the object of picking up calls, or whether it is being operated from designated stands.

The small hole $x$ at the lower margin of the tape indicates that the cover of the recording instrument was closed while the holes $y$ punched near the top edge of the tape indicate that the flag was operated to start an earning trip. In other words each time the flag is moved from vacant into recording position a hole $y$ is punched in the upper part of the tape, the record from then on being made on the lower part of the tape, namely the record A.

Also, as heretofore explained, the speed of the vehicle may be indicated by applying a speed scale to the oblique lines.

Figure 7 shows a tape T' with only the longitudinal distance lines 15ᵃ printed thereon, the time lines being omitted, and necessitating the use of the present reading device to graphically decipher the same.

Upon reading the tape with the present device the operator can readily determine the following:—Starting time of each trip; finishing time of each trip; mileage of each trip; number, length and time of stops on each trip; speed traveled at any time; time the flag was put up, distance traveled and time spent with flag up; amount of unpaid waiting time; and the time and distance traveled with the flag in not recording position.

Without further description it is thought that the features and advantages of the invention will be readily apparent to those skilled in the art and it will of course be understood that changes in the form, proportion and other details of construction may be resorted to without departing from the spirit of the invention or scope of the appended claims.

I claim:—

1. A reading device for unprinted tapes including a tape holder having a time scale including a relatively adjustable hour indicator arranged at one side thereof, a delineated distance scale adapted to be superimposed on the tape, and index lines for the time scale crossing the delineations of the distance scale.

2. A reading device for unprinted record tapes including a holder for the tape, a time scale arranged at one side of the holder and including a relatively adjustable hour indicator, and a distance scale adapted to be superimposed on the tape within the tape holder.

3. A reading device for unprinted record tapes including a holder for the tape, a time scale arranged at one side of the holder and including a relatively adjustable hour indicator, and a distance scale adapted to be superimposed on the tape within the tape holder, having thereon crossing time and distance lines.

4. A reading device for unprinted record tapes including a tape guideway, a time scale arranged at one edge of the guideway and including a face plate having openings and the spaces between the openings provided with a minute scale including numerals indicating subdivisions of the hour, an hour indicator having numerals representing hours of the day arranged thereon in successive order whereby the hours will appear in proper order through the openings when the said hour indicator has been set, a transparent cover for the guideway, a distance scale comprising equally spaced longitudinal lines arranged on said transparent cover, and minute lines crossing the longitudinal distance lines and projected to register with the numerals of the minute scale.

5. A reading device for unprinted record tapes including a tape holder and a transparent cover therefor; a time scale arranged at one edge of the tape holder and including a mask having openings and a strip bearing numerals indicating hours of the day in proper sequence, and minute scales in the spaces between the openings; longitudinal distance lines on the transparent cover, and transverse minute lines also on said transparent cover and projected to read on the figures of the minute scales.

6. A reading device for unprinted record tapes including a support having means providing a tape guideway, a channel formed at one side of the tape guideway, a face plate having openings overlying the channel, a strip adapted to be shifted in said channel and provided with numerals indicating hours of the day, said strip adapted to be shifted in the channel whereby successive hour numerals will be displayed through the openings while the intervening numerals will be masked by the face plate.

7. A reading device for unprinted record tapes including a support having means providing a tape guideway, a face plate, a fractional hour scale provided at the edge of the face plate, a transparent member having longitudinal and transverse lines thereon and adapted to be positioned over the tape guideway, the said longitudinal lines representing fractions of a mile and the said transverse lines marking off subdivisions of an hour.

8. A reading device, for unprinted tapes having record lines thereon, comprising a combined time and distance scale adapted to be superimposed on the tape, said time scale including an adjustable hour indicator.

9. A reading device for tapes having record lines thereon indicating the movement of a cab during its working period, said device including a time scale comprising an adjustable hour indicator and a relatively fixed minute scale.

10. A reading device for unprinted record tapes including a casing, a base within said casing, a frame hinged to said base, a transparent plate carried by said frame and provided with horizontal lines representing distance and vertical lines representing time, a guideway secured to said base and provided with a channel, a face plate having apertures therein overlying the said channel, an adjustable hour indicator slidable within said channel, said adjustable hour indicator being provided with numerals indicating hours of the day in proper sequence so that successive hours will appear beneath apertures in the said face plate, said face plate being provided with minute scales in the places between the said apertures, and means whereby a tape will be held in proper position relative to the lines on the transparent plate.

11. In a reading device for tapes, an adjustable hour indicator provided with a plurality of groups of numbers, each of which groups of numbers consists of numbers from 1 to 12 inclusive, and a plate having indications thereon representing minutes.

In testimony whereof I hereunto affix my signature.

JULIUS GLUCK.